US011030540B2

United States Patent
Kratz et al.

(10) Patent No.: US 11,030,540 B2
(45) Date of Patent: Jun. 8, 2021

(54) USER ACTIVITY RECOGNITION THROUGH WORK SURFACES USING RADIO-FREQUENCY SENSORS

(71) Applicant: FUJI XEROX CO., LTD., Tokyo (JP)

(72) Inventors: Sven Kratz, San Jose, CA (US); Miteshkumar Patel, San Jose, CA (US); Yusuke Yamaura, Kanagawa (JP); Daniel Avrahami, Mountain View, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 848 days.

(21) Appl. No.: 15/594,528

(22) Filed: May 12, 2017

(65) Prior Publication Data

US 2018/0330254 A1 Nov. 15, 2018

(51) Int. Cl.
*G06N 5/04* (2006.01)
*H04Q 9/00* (2006.01)
*G06N 20/00* (2019.01)
*G08C 17/02* (2006.01)

(52) U.S. Cl.
CPC .............. *G06N 5/047* (2013.01); *G06N 20/00* (2019.01); *G08C 17/02* (2013.01); *H04Q 9/00* (2013.01); *G06N 5/04* (2013.01); *G08C 2201/30* (2013.01); *G08C 2201/50* (2013.01); *G08C 2201/91* (2013.01); *H04Q 2209/40* (2013.01)

(58) Field of Classification Search
None
See application file for complete search history.

(56) References Cited

PUBLICATIONS

Padoy, Workflow and Activity Modeling for Monitoring Surgical Procedures, Doctoral Thesis, Technische Universitaet Muenchen et de l'Universite Henri Poincare, 2016, pp. 1-166 (Year: 2016).*
Padoy, Workflow and Activity Modeling for Monitoring Surgical Procedures, Universite Henri Poincare; Technische Universitaet Muenchen, 2010, pp. 1-166 (Year: 2010).*
Liu, et al., Integration of RFID and Wireless Sensor Networks, 2009, pp. 1-29 (Year: 2009).*
Zhang, Chenyang; Tian, Yingli, "RGB-D Camera-based Daily Living Activity Recognition", 7 pages. Journal of Computer Vision and Image Processing, 2(4):12, 2012.
Yeo, Hui-Shyong; Flamich, Gergely; Schrempf, Patrick; Harris-Birtill, David; and Quigley, Aaron. "Radarcat: Radar Categorization for Input & Interaction". 9 pages. In Proceedings of UIST 2016, pp. 833-841.
Wilson, Robert, "Reflection and Transmission Losses Through Common Building Materials. 2.4 GHz vs 5 GHz", 49 pages. Aug. 2002. Copyright 2002 Magis Networks, Inc. E10589.

(Continued)

*Primary Examiner* — Wilbert L Starks
(74) *Attorney, Agent, or Firm* — Procopio, Cory, Hargreaves & Savitch LLP

(57) ABSTRACT

Systems and methods of the present disclosure can involve several work spaces wherein each of the work spaces are associated with a set of activities and wherein each of the work spaces are coupled to one or more radio frequency (RF) sensors. Through RF sensor data detected from interactions with the work surface, example implementations described herein can determine which activity from the set of activities is being conducted through the application of a recognition algorithm that is generated from a machine learning algorithm.

18 Claims, 14 Drawing Sheets

(56) References Cited

PUBLICATIONS

Andreas Bulling, Ulf Blanke, and Bernt Schiele. 2014. "A tutorial on human activity recognition using body-worn inertial sensors". ACM Comput. Surv. 46, 3, Article 33 (Jan. 2014), 33 pages. http://dx.doi.org/10.1145/2499621.

Cho, Yongwon, Yunyoung Nam, Yoo-Joo Choi, and We-Duke Cho. "SmartBuckle: human activity recognition using a 3-axis accelerometer and a wearable camera." In Proceedings of the 2nd International Workshop on Systems and Networking Support for Health Care and Assisted Living Environments, p. 7. ACM, 2008. https://doi.org/10.1145/1515747.1515757.

Wilson, Andrew D., and Benko, Hrvoje. "Crossmotion: fusing device and image motion for user identification, tracking and device association." In Proceedings of the 16th International Conference on Multimodal Interaction, pp. 216-223. ACM, 2014. https://doi.org/10.1145/2663204.2663270.

Philipose, Matthai; Fishkin, Kenneth P.; Mike Perkowitz, Donald J. Patterson, Dieter Fox, Henry Kautz, and Dirk Hahnel. "Inferring activities from interactions with objects." IEEE pervasive computing 3, No. 4 (2004): 50-57. http://homes.cs.washington.edu/~matthai/pubs/pervasive_sharp_04.pdf.

Adib, Fadel; Hsu, Chen-Yu; Mao, Hongzi; Katabi, Dina; Durand, Fredo "Capturing the Human Figure Through a Wall", 13 pages. SIGGRAPH Asia '15 Technical Paper, Nov. 2-5, 2015, Kobe, Japan. ACM 978-1-4503-3931-5/15/11.

Alsheikh, Mohammad Abu; Selim, Ahmed; Niyato, Dusit; Doyle, Linda; Lin, Shaowei; Tan, Hwee-Pink "Deep Activity Recognition Models with Triaxial Accelerometers", 7 pages. The Workshops of the Thirtieth AAAI Conference on Artificial Intelligence. Copyright c 2016, Association for the Advancement of Artificial Intelligence (www.aaai.org). 1511.04664v2 [cs.LG] Oct. 25, 2016.

Damen, Dima; Gee, Andrew; Mayol-Cuevas, Walterio; Calway, Andrew "Egocentric Real-Time Workspace Monitoring Using an RGB-D Camera", 8 pages, Intelligent Robots and Systems (IROS), 2012 IEEE/RSJ International Conference on, pp. 1029-1036. IEEE, 2012.

Lara, Oscar D.; Labrador, Miguel A., "A Survey on Human Activity Recognition Using Wearable Sensors", 18 pages. IEEE Communications Surveys & Tutorials, vol. 15, No. 3, Third Quarter 2013. 1553-877X/13 Copyright 2013 IEEE.

Lien, Jaime; Gillian, Nicholas; Karagozler, M. Emre; Amihood, Patrick; Schwesig, Carsten; Olson, Eric; Raja, Hakim; Poupyrev, Ivan "Soli: Ubiquitous Gesture Sensing with Millimeter Wave Radar", 19 pages. Google ATAP. Copyright 2016. ISBN: 978-1-4503-4279-7/16/07. SIGGRAPH 2016, Jul. 24-28, 2016, Anaheim, CA. ACM Trans. Graph., vol. 35, No. 4, Article 142, Publication Date: Jul. 2016.

Liu, Liang; Popescu, Mihail; Skubic, Marjorie; Rantz, Marilyn; Yardibi, Tarik; Cuddihy, Paul, "Automatic Fall Detection Based on Doppler Radar Motion Signature", 4 pages. 2011 5th International Conference on Pervasive Computing Technologies for Healthcare (PervasiveHealth) and Workshops, pp. 222-225. IEEE, 2011.

Pedregosa, Fabian; Varoquaux, Gael; Gramfort, Alexandre; Michel, Vincent; Thirion, Bertrand, "Scikit-learn: Machine Learning in Python", 6 pages. Copyright 2011.

Poppe, Ronald, "A Survey on Vision-Based Human Action Recognition", 15 pages. Copyright 2009 Elsevier B.V. 0262-8856.

Wang, Guochao; Gu, Changzhan; Inoue, Takao; Li, Changzhi, "A Hybrid FMCW-Interferometry Radar for Indoor Precise Positioning and Versatile Life Activity Monitoring", 11 pages. IEEE Transactions on Microwave Theory and Techniques, vol. 62, No. 11, Nov. 2014. 0018-9480 Copyright 2014 IEEE.

Daniel Weinland, Remi Ronfard, Edmond Boyer. A Survey of Vision-Based Methods for Action Representation, Segmentation and Recognition. [Research Report] RR-7212, INRIA. 58 pages. Feb. 24, 2010, pp. 54. <inria-00459653>.

Wiese, Jason; Saponas, T. Scott; Brush, A.J. Bernheim, "Phoneprioception: Enabling Mobile Phones to Infer Where They Are Kept", 10 pages. CHI 2013, Apr. 27-May 2, 2013, Paris, France. Copyright © 2013 ACM 978-1-4503-1899-0/13/04

\* cited by examiner

Activity Questionnaire

Please make sure to answer this brief questionnaire.

I was in my office during the last 15 minutes:
- Yes
- No

If YES (I was in my office), I was:
- sitting at my desk.
- away from my desk.

If YES (I sitting at my desk), I was:
- working on my computer.
- working without my computer (e.g., paperwork).
- Neither

While sitting at my desk and executing my activity, I was also eating or drinking:
- false
- true Associated Sensor ID: SENS1
Associated User ID: ID1
Time Displayed: DATE1

FIG. 3

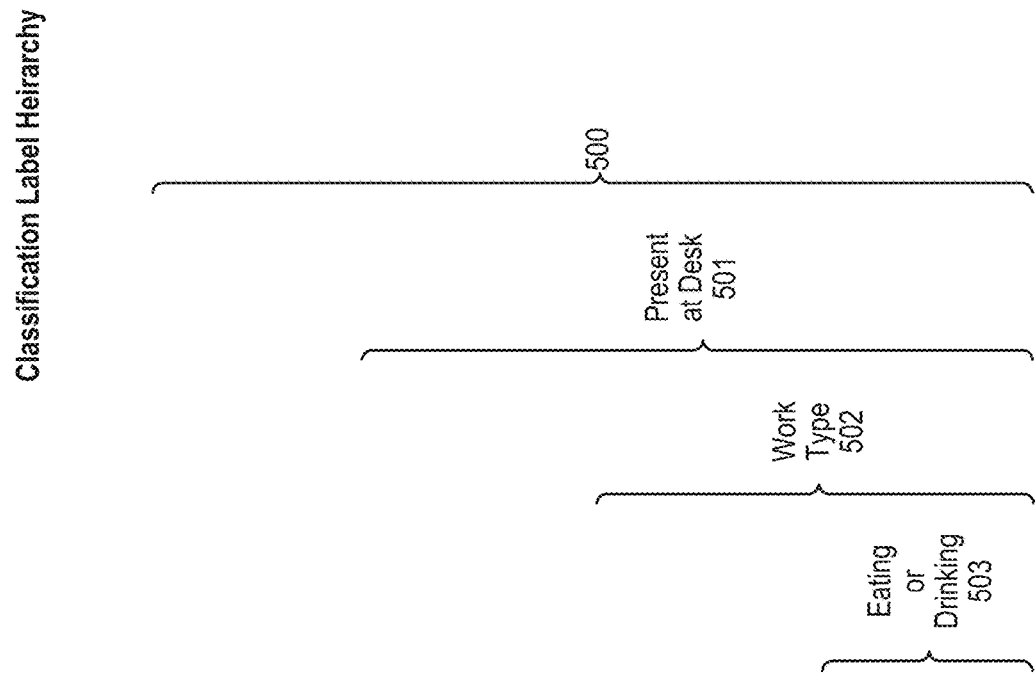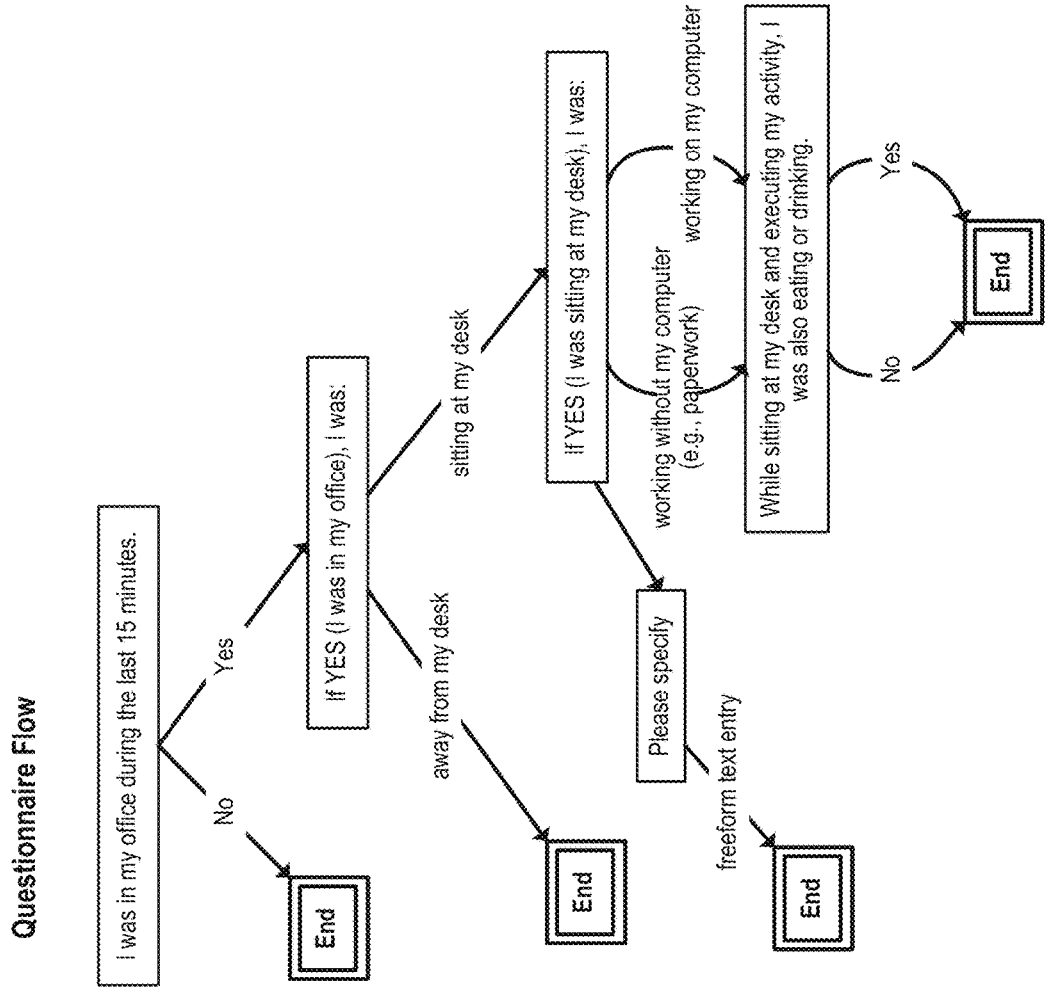
FIG. 5

| Classifier/Activity | In Office/ Out of Office | Computer Work/ Non-Computer Work | Eating & Drinking / Not Eating | In Office: at desk/ not at desk |
|---|---|---|---|---|
| Decision Tree | 59 | 58 | 75 | 54 |
| Random Forest | 62 | 55 | 83 | 56 |
| Extra Tree | 54 | 54 | 84 | 57 |
| Support Vector Machine | 78 | 72 | 84 | 75 |
| Logistic Regression | 60 | 67 | 88 | 66 |
| Deep Neural Network (LeNet Architecture) | 60 | 60 | 85 | 59 |

FIG. 9

Work Surface Information 1000

| Work Surface | Activity | RF Sensor signature | IMU sensor signature |
|---|---|---|---|
| W1 | A1 | RF1 | IMU1 |
|  | A2 | RF2 | NULL |
| W2 | A3 | RF3 | IMU3 |
|  | A4 | RF4 | IMU4 |

FIG. 10

Transaction Information 1100

| Transaction | Activity |
|---|---|
| T1 | A1 |
|  | A2 |
|  | A4 |
| T2 | A3 |
|  | A4 |

USER ACTIVITY RECOGNITION THROUGH WORK SURFACES USING RADIO-FREQUENCY SENSORS

BACKGROUND

Field

The present disclosure is generally directed to sensor systems, and more specifically, to determining activities based on radio frequency (RF) sensors.

Related Art

Recognizing user activities that are performed above a desk or a counter can be used for many applications. For example, for office work and in retail environments, such activity recognition can facilitate understanding of work processes and productivity, predicting availability, making break recommendations, augmenting the environment, and so on. Many related art solutions proposed for recognizing activities above a desk rely on cameras. Camera-based solutions, however, often raise privacy concerns. Furthermore, most camera-based solutions are sensitive to changes in illumination and occlusion, and also may require that the workers be within the line of sight of the camera.

In related art solutions that combine cameras and other sensors (e.g., wearable), privacy concerns may still occur. Further, solutions that rely solely on wearable-sensors (e.g., a worn inertial measurement unit (IMU), such as in a smart watch or bracelet form) can encounter several problems. For example, while wearable-sensors can track a moving limb (e.g., the user's wrist), such sensors are not configured to detect other objects that are present and are relevant to the activity.

In many activities, knowing that an object is part of the action can be important for the recognized activity (e.g., classifying that the user such as a store clerk is placing a bottle into a bag). Further, IMU-based solutions may not be configured to determine where an activity is occurring. For example, if the work surface is a counter in a store, IMU-based solutions may not be configured to determine whether an action takes place on the cashier side of the counter or the customer side of the counter.

SUMMARY

Example implementations described herein are directed to a system for activity recognition of workspaces through the utilization of RF sensors (e.g. sensors operating in the 3.3-10.3 GHz spectrum). The example implementations of the present disclosure allow the placement of sensors out of view behind light construction materials such as plywood, which makes them less obtrusive than cameras. Example implementations described herein also are directed to positioning sensors such that a number of activities on a knowledge workers desk or on a retail counter can be recognized. Example system implementation details of user-driven data labeling method can be based on a browser extension and machine learning methods for implementing activity recognition using the sensors in the proposed configuration with a labeled data set obtained in a naturalistic way.

The example implementations described herein may also support the activity recognition of the RF sensors through utilization of wearable sensor data. In such example implementations, the system uses the RF sensors to estimate the physical position of the activity above or near a work surface. The example implementations utilize the combination of wearable and RF sensors for many purposes. For example, in the presence of more than one person, the example implementations can distinguish between observed people and wearable sensor data. Further, the example implementations can thereby improve recognition accuracy with wearable sensor data. The example implementations also facilitate the system to be aware of objects on the work surface (using the RF sensors) in addition to the action performed (using both the wearable and RF sensors).

Aspects of the present disclosure can include a non-transitory computer readable medium, storing instructions for executing a process for managing a plurality of work surfaces, each of the plurality of work surfaces associated with one or more radio frequency (RF) sensors, each of the plurality of work surfaces associated with a set of activities. The instructions can include monitoring the one or more RF sensors for each of the plurality of work surfaces; for the one or more RF sensors of a work surface from the plurality of work surfaces providing RF sensor data: applying a recognition algorithm associated with the work surface from the plurality of work surfaces to determine, from the RF sensor data, an activity from the set of activities associated with the work surface from the plurality of work surfaces corresponding to the RF sensor data; wherein the recognition algorithm is generated from machine learning.

Aspects of the present disclosure can further include a method for managing a plurality of work surfaces, each of the plurality of work surfaces associated with one or more radio frequency (RF) sensors, each of the plurality of work surfaces associated with a set of activities. The method can include monitoring the one or more RF sensors for each of the plurality of work surfaces; for the one or more RF sensors of a work surface from the plurality of work surfaces providing RF sensor data: applying a recognition algorithm associated with the work surface from the plurality of work surfaces to determine, from the RF sensor data, an activity from the set of activities associated with the work surface from the plurality of work surfaces corresponding to the RF sensor data; wherein the recognition algorithm is generated from machine learning.

Aspects of the present disclosure can further include an apparatus communicatively coupled to a plurality of work surfaces, each of the plurality of work surfaces coupled to one or more radio frequency (RF) sensors, each of the plurality of work surfaces associated with a set of activities managed by the apparatus. The apparatus can include a memory, configured to manage the set of activities for each of the plurality of work surfaces; and a processor, configured to: monitor the one or more RF sensors for each of the plurality of work surfaces; for the one or more RF sensors of a work surface from the plurality of work surfaces providing RF sensor data: apply a recognition algorithm associated with the work surface from the plurality of work surfaces to determine, from the RF sensor data, an activity from the set of activities associated with the work surface from the plurality of work surfaces corresponding to the RF sensor data; wherein the recognition algorithm is generated from machine learning.

Aspects of the present disclosure can further include a system for managing a plurality of work surfaces, each of the plurality of work surfaces associated with one or more radio frequency (RF) sensors, each of the plurality of work surfaces associated with a set of activities. The system can include means for monitoring the one or more RF sensors for each of the plurality of work surfaces; for the one or more RF sensors of a work surface from the plurality of work surfaces providing RF sensor data: means for applying a recognition algorithm associated with the work surface from the plurality of work surfaces to determine, from the RF sensor data, an activity from the set of activities associated with the work surface from the plurality of work surfaces corresponding to the RF sensor data; wherein the recognition algorithm is generated from machine learning.

BRIEF DESCRIPTION OF DRAWINGS

FIG. 3 illustrates an example of a user-driven labeling system, in accordance with a n example implementation.

FIG. 5 illustrates an example hierarchy of the questions that can be used, in accordance with an example implementation.

FIG. 9 illustrates initial results of model validation for the "knowledge worker" scenario using classical and DNN machine learning algorithms.

FIG. 10 illustrates an example management table for work surface information, in accordance with an example implementation.

FIG. 11 illustrates an example management table for transaction information, in accordance with an example implementation.

DETAILED DESCRIPTION

Figure 1A:
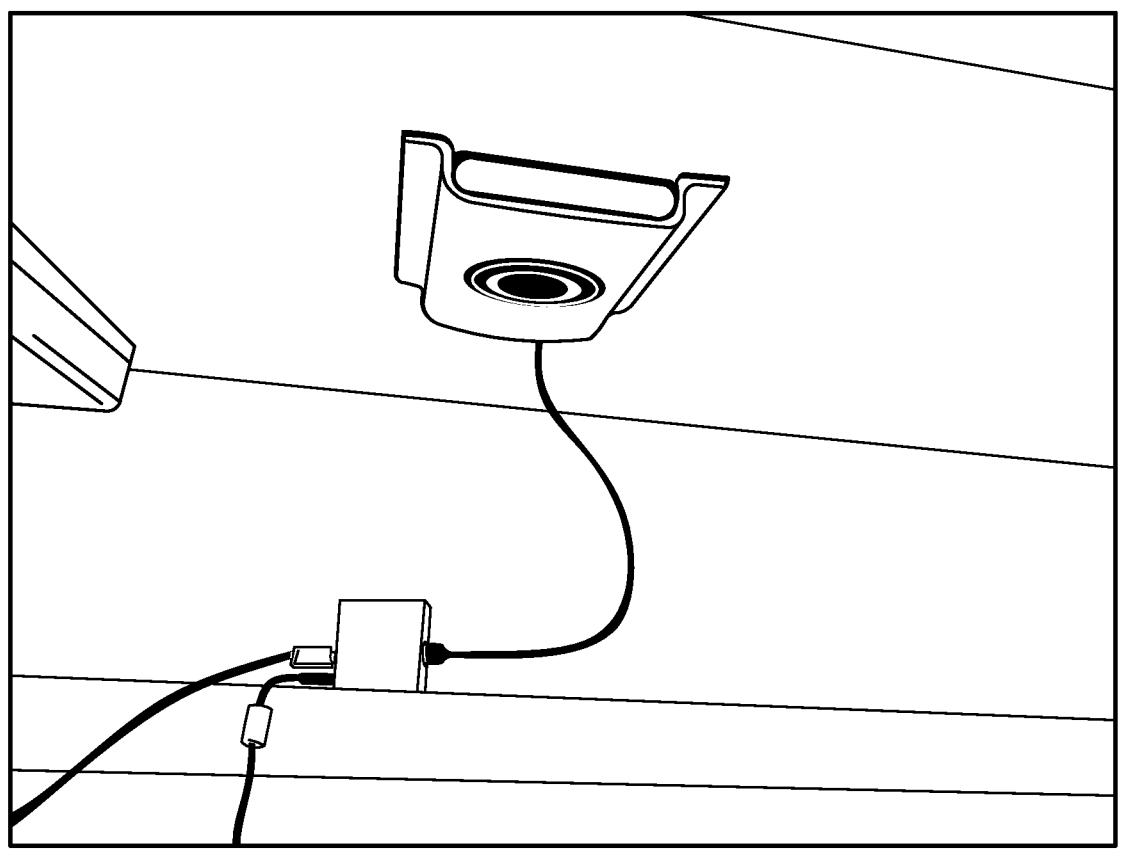
FIGS. 1(a) to 1(c) illustrate example sensor elements utilized by example implementations.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations involve a system and method for recognizing the activity of users through work surfaces such as tables, countertops, or any opaque or transparent surface used in working areas. The example implementations described herein are based on data collected from radio-frequency (RF) sensors that operate in a range of frequencies (e.g., between 3.3-10.3 GHz). Such frequency ranges allows the sensor to "see" through light dielectric materials such as wood or drywall. Thus, such RF sensors can be mounted unobtrusively under desks, e.g., for tracking knowledge worker activity or countertops, e.g., for tracking activity at store point-of-sales (POS). The RF sensors do not necessarily need to be within the line of sight of the user being monitored.

The example implementations facilitate user activity tracking via an RF sensor mounted under a work surface. For example, the work surface can be the desk of a knowledge worker, or a countertop at a POS in a convenience store.

Figure 1B:
Figure 1C:

FIGS. 1(a) to 1(c) illustrate example sensor elements utilized by example implementations. FIG. 1(a) illustrates an example of a placement of an RF sensor under a work surface such as a desk or a POS counter. In the example of FIG. 1(a), the RF sensor is mounted under a user desk in a housing such as a 3D printed housing, however, it can be mounted anywhere on the desk depending on the desired implementation. FIG. 1(b) illustrates the approximate sensor placement location as viewed from the top of the user work area of FIG. 1(a). The "X" indicates the approximate placement of the sensor. In example implementations, the work surface is transmissive to RF signals. However, many common construction materials (e.g., plywood, particle board, fiberglass) have fairly high transmisiveness to RF signals at GHz frequencies. RF sensors can be used to track a wide range of activities, from direct user input (i.e., gestures) to more longitudinal activities such as "computer work" or "paper work". Other work surfaces may be utilized other than a desk in accordance with the desired implementation, and the present disclosure is not limited to any particular work surface. Other work surfaces can include, for example, tables, chairs, store counters, booths, and so on depending on the desired implementation.

In example implementations, the sensor data from the RF sensors may also be augmented with sensor data from wearable devices. FIG. 1(c) illustrates an example wearable device. Each user whose activities are to be recognized may be instrumented with sensors. For example, each user can wear a smartwatch that captures sensor data, such as IMU data. In such example implementations, data from RF sensor(s) and wearable sensors can be aggregated for processing. RF sensors can require one or more wireless relay devices. If activity recognition is to be detected in real-time, data from the sensors may need to be transmitted via an additional communication device such as a smartphone.

Figure 2:
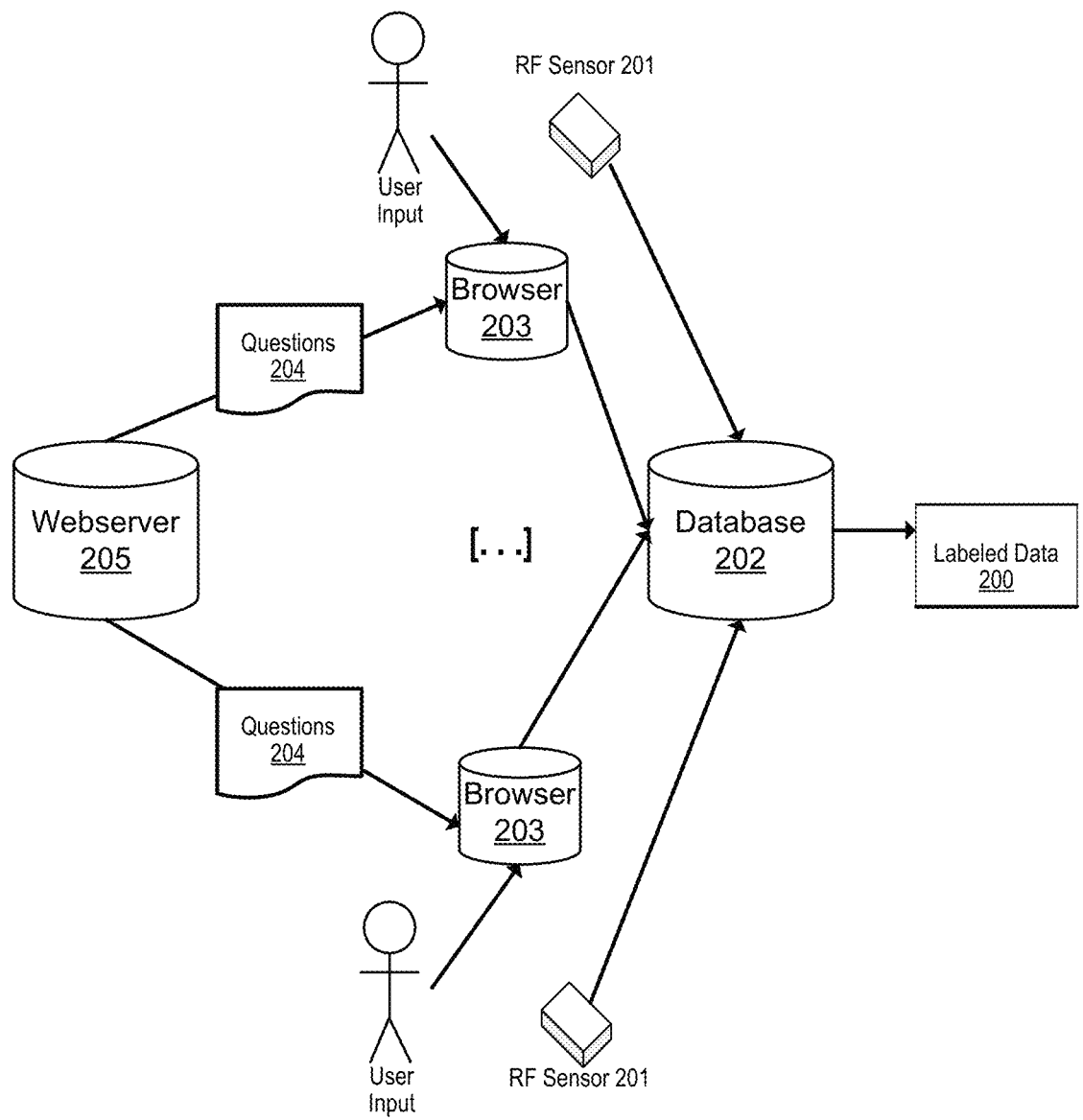
FIG. 2 illustrates an example architecture upon which example implementations may be applied.

FIG. 2 illustrates an example architecture upon which example implementations may be applied. In the example implementation of FIG. 2, labeled data 200 can utilized to train models for activity recognition. In the case of desktop activity recognition (i.e., the knowledge worker scenario), example implementations can involve a user-driven labeling system in order to obtain labeled activity data. All data recorded by RF sensors 201 is saved to a database 202 which can be associated with a time stamp and the identifier (ID) of the sensor that captured it.

In example implementations, labeled data 200 can be provided from user input through a browser 203. Browser 203 is configured to load a questionnaire 204 as provided by webserver 205. Further details regarding examples of questionnaires are provided with respect to FIGS. 3 and 5.

FIG. 3 illustrates an example of a user-driven labeling system, in accordance with an example implementation. In the example screenshot of FIG. 3, the data labels can be generated by the user via a web browser extension that periodically shows a popup with a questionnaire that provides questions regarding recent activities. The user's answers, timestamp and associated sensor ID are then saved to a database. To obtain training data for machine learning, user labels are reconciled via timestamp and sensor ID to obtain a training sample, e.g., allocating the time window (e.g., such as last 15 minutes or other depending on the desired implementation) of sensor data prior to the user's submission of the questionnaire data. Example implementations can thereby obtain a representation in sensor data of the user's activity and a labeling of this data via the questionnaire responses. Other methods for labeling (e.g., via real-time input from the user via a terminal as user is conducting an activity) may also be utilized depending on the desired implementation, and the present disclosure is not limited to a questionnaire.

Deep Neural Network (DNN) based models have successfully been utilized for different human activity recognition system using various sensors such as images, accelerometer and gyro, depth images. The DNN framework can provide various advantages over the traditional machine learning techniques such as eliminating the need to generate handcrafted features as done in traditional activity recognition systems. Further, by manipulating the depth of the DNN framework, better accuracy can be achieved. In example implementations, activities are captured using RF sensors and the self-feature learning capabilities of DNN can be utilized to classify various activities, although the present disclosure is not limited thereto and other machine learning techniques may be utilized depending on the desired implementation.

Further, large datasets may be required to optimally train and test classical machine learning and DNN algorithms. In example implementations, small amounts of samples (e.g., range of few hundreds) can be utilized, and larger data sets can be generated using different data synthesis techniques. For example, a kernel density estimation technique (a non-parametric generative model) can be utilized, which may efficiently draw/generate new samples from the existing samples. Through such an example implementation, synthetic data can be generated in the order of multiple times the original data samples.

Figure 4:
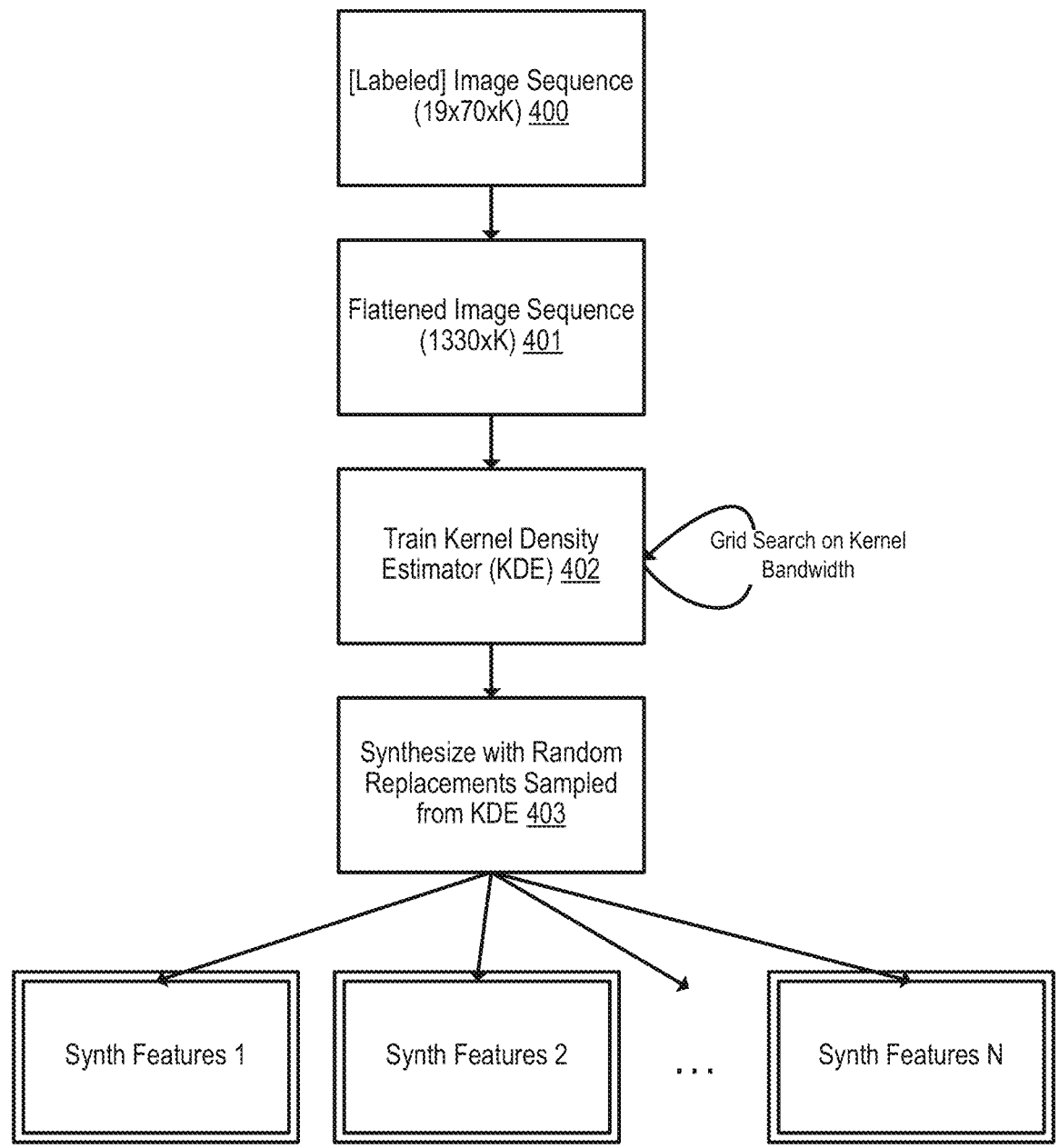
FIG. 4 illustrates an example flow chart for the feature generation technique, in accordance with an example implementation.

FIG. 4 illustrates an example flow chart for the feature generation technique, in accordance with an example implementation.

In an example implementation involving activity recognition in the "knowledge worker" scenario, to obtain labeled data for training activity, users (e.g., all knowledge workers in an industrial research lab) can be equipped with an RF sensor. In an example implementation, the sensor is placed in the centerline of the desktop work area for each user, such as a short distance from the edge of the user desk. The RF sensor is connected to an embedded device configured to transmit sensor readings to a database (e.g., via wireless, local area network, and so on). Sensor data is captured in accordance with a desired rate of frames per second. The output of the sensor is a grayscale "image" (e.g. 19×70 image) of the radar return, representing measured intensities in a polar coordinate frame.

To permit labeling of activity by the users, an example implementation can involve an extension for the web browser that periodically provides a popup to the user that contains a questionnaire on user activities as illustrated in FIG. 3. To ensure that the popup is noticed, an example implementation can include providing a popup at the top level of the user window manager, not just of the browser. This top-level placement can be refreshed (e.g. every 10 seconds) until the user responds submits the questionnaire, which ensures that it can be processed without significant delay by the user.

As illustrated in FIG. 4, at 400, first the labeled image sequence is received, and then converted into a flattened image sequence at 401. The flattened image sequence is utilized to train the kernel density estimator at 402, during which a grid search on kernel bandwidth may be conducted. At 403, further features may be synthesized with random replacements sampled from the kernel density estimator to generate synth features that are utilized to train the machine learning algorithm. Through the implementation of the flow of FIG. 4, a machine learning algorithm can therefore be generated that is configured to associate RF sensor data with activities for a given work surface.

FIG. 5 illustrates an example hierarchy of the questions that can be used, in accordance with an example implementation. The questionnaire can be configured to show a hierarchical set of questions that are only revealed based on specific user responses, e.g., if the user responds with "no" to the first statement (e.g., "I was in my office during the last 15 minutes."), the rest of the questionnaire is skipped, as the follow-up questions would in that case be irrelevant. The label hierarchy can also facilitate the construction of a hierarchical classification system that can attempt to classify the most general states (e.g., user in office) first, and only then try to classify more specific activities. Such an example implementation may result in more accurate activity classification.

In the example of FIG. 5, the question provided at 500 establishes whether the user in question was in the office (e.g., interacting or in proximity with the desired work surface) or not. If not, then the questionnaire can end, otherwise the questionnaire proceeds to 501 to determine the next question in the hierarchy (e.g. if the user is at the desk). If the user is at the work surface or in the vicinity of the work surface, then the flow proceeds to 502 to determine what action the user was conducting with the work surface (e.g. working, sitting, eating or drinking). In this example, the desired detected activity is eating or drinking, so the flow proceeds to 503 to determine if the user was eating or drinking near the desk.

In example implementations, a web server such as Node.js or others can be implemented to serve the questionnaire for the popup. This example implementation can facilitate the change the content of the questionnaire independent of the web browser extension. To obtain labeled training data, the timestamp and sensor ID can be reconciled with data from the sensor database. From the sensor data, the last set of data within a time window is obtained prior to the questionnaire response submission time, to filter out the user action of filling out the form itself. Having defined timestamp and sensor ID as database keys for the sensor data, such an example implementation can be fairly efficient and executed in a matter of seconds in a database containing many (e.g. hundreds of thousands) data points.

In example implementations, the exact number of data points captured by the RF sensors over the last time window can vary and is not deterministic, due to transmission of the stored data to a database, where latency and transmission speed vary. A further issue is the dimensionality of the data is very large (around e.g. 19×70×K values per sample, with K being around 870), and therefore needs to be reduced to build effective machine learning models.

In example implementations, preprocessing strategies can be utilized to fix the dimension of the samples for simpler classification. In one example preprocessing strategy, the sample is divided into n equal slices, and then the median is calculated for each of the slices. The medians are concatenated to form a feature vector. A feature vector is thereby obtained of the dimensionality 19×70×n.

In another example preprocessing strategy, principle component analysis (PCA) can be utilized to reduce the dimensionality of the original input sample of 19×70×K values to a feature vector with a dimensionality of n×n as follows. At first, all input images are "flattened" in the sequence, i.e., transform the data from a 19×70×K format to a 1330×K matrix. Then, PCA is executed on the matrix rows, obtaining a 1330×n matrix. Afterwards, PCA is executed on the resulting matrix columns (i.e., on transpose of previous result), obtaining a n×n matrix.

Through the use of example implementations with RF sensors, activity can be tracked with RF sensors that can be mounted discretely in a location not visible to the users, as RF sensors do not have to be in the line of sight of the monitored user. Unlike camera images and camera based systems in the related art, the coarse image provided by RF systems is less likely to lead to privacy concerns as the captured sensor information is usually not interpretable directly by humans.

Further, in contrast to camera based systems of the related art, RF sensors can directly detect the presence of different materials due to different transmissivity/reflectivity properties of the materials. In contrast to related art software-based activity trackers, RF sensors can also detect user presence and track user activity when a user is not interacting with his computer workstation. Example implementations of the activity tracking method described herein do not require any specific and potentially security-critical software (e.g., keyboard and mouse loggers) to be installed on the user computer. Instead, keyboard and mouse activity can be captured indirectly when RF sensors are placed beneath the usual work area of the user.

In additional example implementations, wearable devices can be utilized to augment the sensing of the RF sensor systems of the present disclosure. Example implementations can further involve a system configured to facilitate user activity tracking via a combination of one or more RF sensors mounted under or on a work surface, and sensor data worn by the user (e.g., in the form of a smartwatch or bracelet). For example, in a store setting, one or more RF sensors can be mounted under a counter, and store employees wear a smartwatch that collects motion data.

Figure 6:
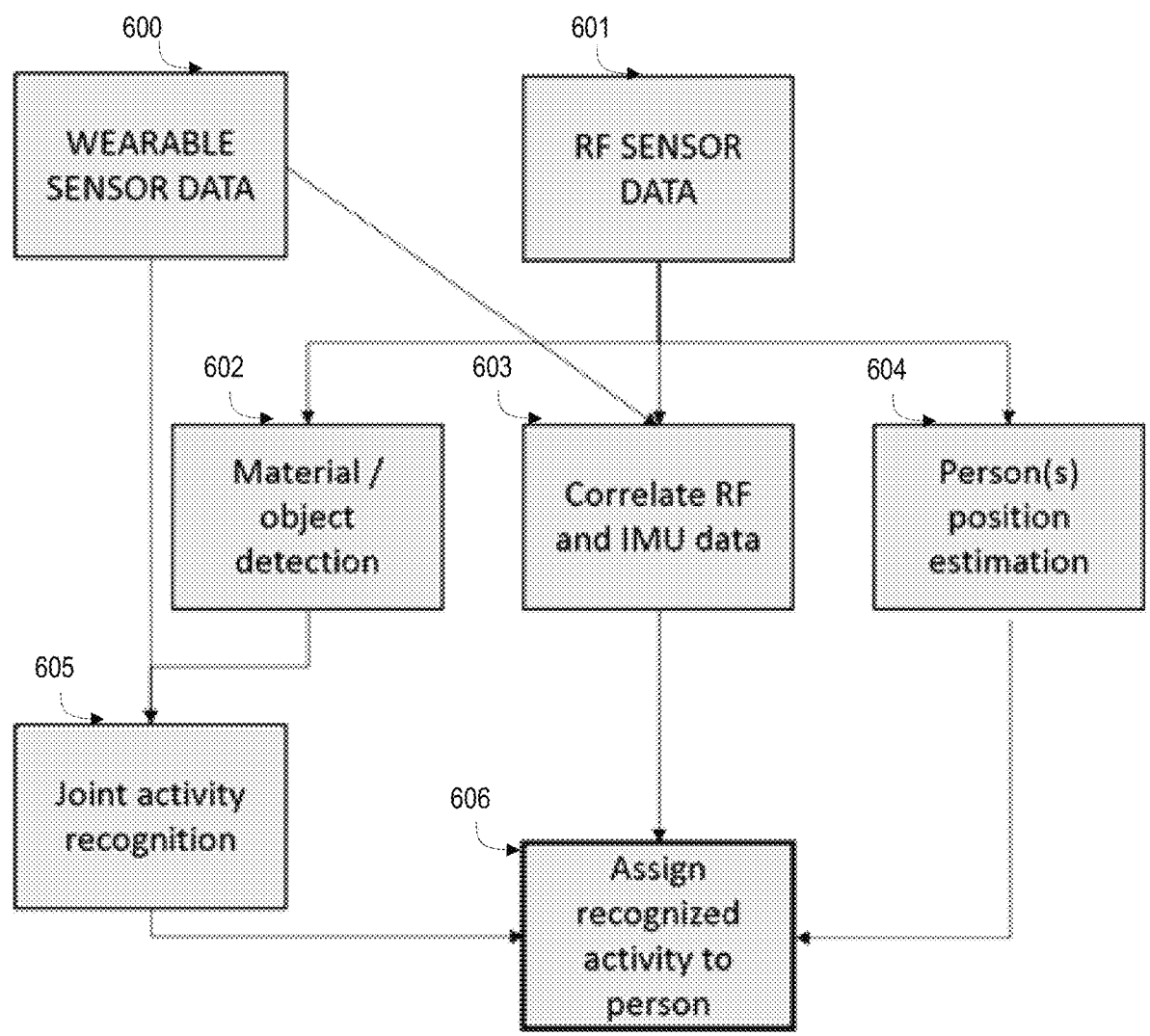
FIG. 6 illustrates an example flow diagram of the system, in accordance with an example implementation.
Figure 7:
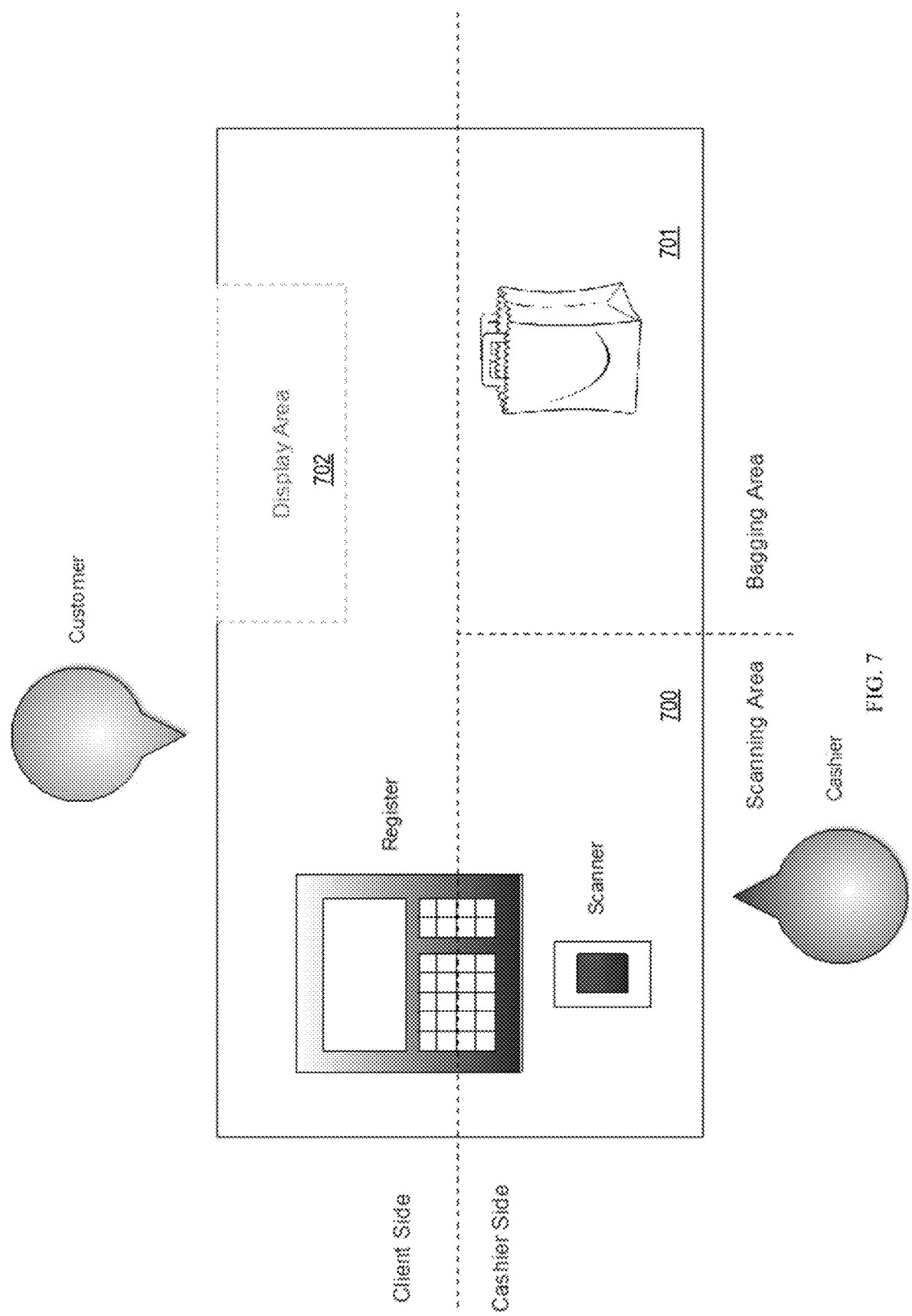
FIG. 7 illustrates an example implementation of a work surface.

FIG. 6 illustrates an example flow diagram of the system, in accordance with an example implementation. Specifically, FIG. 6 illustrates an example flow for data aggregation and reconciliation from various sources, wherein correlation of user actions with location information can be performed. The flow can be executed, for example, by the architecture as illustrated in FIG. 2 or FIG. 7. In the example of FIG. 6, RF Sensor data is provided at 601, and depending on the desired implementation, wearable sensor data 600 may also be provided. At 602, RF sensor data is utilized to determine materials or objects associated with the work surface.

At 603, RF data and wearable sensor data can be correlated. In example implementations that utilize wearable sensor data, correlating data from the RF sensor with data coming from the wearable IMU sensors can be conducted for several purposes. For example, when data from the RF and wearables are correlated (e.g. with respect to location and/or time), the correlation can provide an input that can be used to determine where above the work surface an activity is occurring, and by which user. If data from RF and wearable sensor data are not correlated (e.g. with respect to location and/or time), the non-correlation indicates that an activity seen from the RF sensor is not coming from one of the users wearing sensors, and/or indicates that an activity seen from a wearable sensor is not performed above the work surface.

In example implementations, there are various approaches for correlating data from the RF and wearable sensors which can include, but is not limited to the following. In one example implementation, correlation can be conducted through a classification based approach for correlating data. In this approach a model can be trained using different machine learning techniques with labelled correlated data and utilize the trained model to classify whether the data stream from wearable sensor and RF sensor is correlated.

In another example implementation, correlation of data can be conducted based on a similarity score calculation. In such an approach, RF and IMU sensor data is projected in a common features space (e.g. motion vector) to generate a latent vector. The generated latent vectors of each sensor can further be used for correlation by calculating the similarity scores between the two vectors using a different similarity matrix such as Jacobian, cosine similarity, and so on depending on the desired implementation.

In another example implementation, correlation of data can be conducted by performing common gestures. In such an approach, the user (e.g. wearer of the sensor) is required to perform a specific (pairing) gesture above the work surface (for example, drawing the figure eight in the air) that is reliably detected by both sensors. When the gesture is detected in both sensors, data from the relevant region of the work surface and the wearable sensor are considered to be correlated. Feedback shown, e.g., on the wearable device would indicate that the work surface is tracking and has assigned an ID to the user.

When the data from the RF sensors and the wearable sensors are considered to be correlated, the system can attach the identity of the user wearing the sensor to the activity as detected by both sensors. The system can also attach the position over the surface of the data from the RF sensor to the data from the wearable sensor. Further, the system feeds both sets of data (from both sensors) into an activity recognition process.

Join activity recognition 605 can be conducted from wearable and RF sensors. In example implementations, sensor data from the wearable device and RF sensors can be combined and the correlation can be utilized to determine the activity. The feature extraction is needed in machine-learning techniques. Generally, the feature vectors are extracted from each sensor data separately and combined previous to training a model. In addition to these features, the correlation or co-occurrence relations between elements of each feature vector can be added as new feature. This represents the relationship between user's actions and positions.

Further object material as detected at 602 can also be included in the activity recognition 606 or joint activity recognition 605. In example implementations, knowledge of objects on the work surface can be utilized to improve recognition. Consider the case where the system is trying to recognize that a cashier is scanning particular products and then placing them into a bag in a correct order. Using only the wearable sensor may allow detecting that the cashier is placing objects in a bag with some accuracy, but such implementations provide no knowledge of the products being placed in the bag and in which order. However, RF sensors can be used to recognize material composition of objects placed on the work surface to help in activity recognition. Recognition of materials using frequency scanning can be utilized in accordance with the desired implementation.

In example implementations, the identity of the object material, obtained from the RF sensor(s), can be combined with data describing the manipulation of the object, obtained from both the wearable sensor as well as motion detected in the RF sensor.

As illustrated in FIG. 6, estimation of the user and object position 604 can be utilized in the activity recognition 606. The example implementations can apply the estimation of position of people and objects on and around the work surface to improve recognition. Consider that two activities contain similar physical motions and are confused by a system based solely on worn sensors (e.g., taking objects out of a bag, and placing objects in a bag). Information that the activity took place at a specific position on the counter may help disambiguate between the two activities.

FIG. 7 illustrates an example implementation of a work surface. In the example of FIG. 7, the work surface is in the form of a supermarket checkout lane, however, other work surfaces can also be utilized and the present disclosure is not limited thereto. As illustrated in FIG. 7, the work surface can be divided to allow different regions of the work surface to be assigned one or more labels based on their function. For example, a counter can have regions labeled 'worker side' and 'shopper side'. The worker side can be further broken down into a 'scanning area' 700, 'bagging area' 701, and special display areas 702 facing the client.

Since many items in retail environments are tagged with radio frequency identification (RFID) tags for theft prevention or other purposes, another example implementation can involve the utilization of an RFID reader in parallel with the RF sensor to unambiguously associate one or multiple items with the current activity.

Additionally, example implementations can also facilitate tracking motion occurring from the work surface to off of the work surface. The combination of wearable and RF sensors can facilitate implementations wherein an activity performed can start on the work surface but continue off it (or vice versa). Such activities can include, for example, picking up a bag that is on the counter and moving it off the counter. Example implementations can continue tracking the activity using the wearable sensors after it is no longer visible from the RF sensors. It is also possible to attach lower confidence to recognized activity when it is only seen by the wearable sensor. A further affordance of using wearables in this case is to the ability to track transferring of objects between counters, e.g., weigh station and cash register. The user ID can be identified via the wearable and the identity of the material composition of the item through using the RF sensors.

Figure 8:
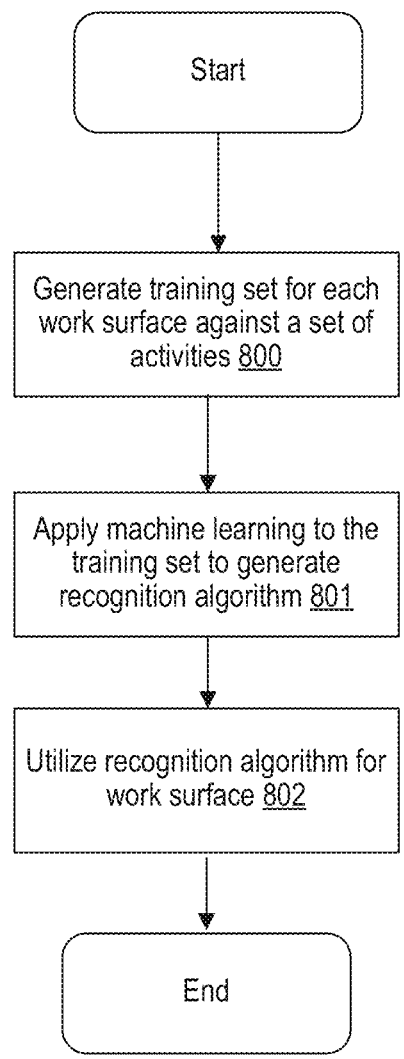
FIG. 8 illustrates an example flow for creating a machine learning algorithm for a work surface associated with a set of activities.

FIG. 8 illustrates an example flow for creating a machine learning algorithm for a work surface associated with a set of activities. At 800, a labeled training set is provided for a work surface versus the activity that occurred on the work surface. The data can include RF data and/or a combination of RF data and wearable sensor data. At 801, the desired machine learning algorithm is applied to the training set to generate a recognition algorithm. The recognition algorithm can be a neural network or other algorithm depending on the machine learning algorithm applied and the desired implementation. At 802, the generated recognition algorithm is utilized for the work surface to sense activities conducted on or near the work surface.

FIG. 9 illustrates initial results of model validation for the "knowledge worker" scenario using classical and DNN machine learning algorithms. Specifically, FIG. 9 illustrates an example set of results obtained through classical machine learning and deep learning algorithms in accordance with an example implementation. Using the techniques described above for generating synthetic data and also balancing training data samples for each class labels to ensure uniformity of data across different classes, different models were trained on the labeled data using Decision Tree, Random Forest, Extra Tree, Support Vector Machine, Logisitic Regression and DNN using LeNet Architecture) classifiers. FIG. 9 illustrates the validation set accuracy of the initial results, grouped by activity/state type and model type.

FIG. 10 illustrates an example management table for work surface information 1000, in accordance with an example implementation. In an example implementation, each work surface is associated with a set of activities expected for the work surface, and each activity in the set of activities for a work surface has a corresponding expected RF sensor data signature and/or wearable sensor data signature. In example implementations, the recognition process generated from the machine learning algorithm conducts a comparison between the received data (e.g. RF sensor data with/without wearable sensor data) with the RF sensor data signature and/or wearable sensor data signature to determine which activity is being conducted. If the recognition process determines that an activity is detected, then it will proceed to provide the detected activity to the system. Further, as illustrated in FIG. 10, each activity in the set of activities can have an associated RF sensor data signature and may or may not also have an associated wearable sensor data signature, depending on the activity and the desired implementation. For example, for work surface W1 and associated activity A2, the activity is based on detection of RF sensor data signature RF2 but does not have a wearable sensor data signature (NULL).

In example implementations, examples of activities that can be detected can include, but is not limited to, detecting whether an employee is present in a room, detecting whether an employee is present at the desk, types of work conducted on the desktop, consuming food or beverages at desk (e.g. using plates or cups, including detection of plates or cups), writing or conducting paper document work, computer text entry, web browsing, playing a computer game and so on, depending on the desired implementation in the case of an employee or knowledge worker. In example implementations involving a cashier counter as the work surface, examples of activities that can be detected can include, but is not limited to, detecting the presence of a sales clerk, detecting the position of the sales clerk, detecting if the sales clerk is idle, detecting the presence of a customer, detecting the position of a customer, handling of payment, item scanning, item bagging, sitting versus standing, and detecting the product type (e.g food, beverage, paper, etc.), depending on the desired implementation.

FIG. 11 illustrates an example management table for transaction information 1100, in accordance with an example implementation. In example implementations, a particular transaction can also be detected and observed. Each transaction can involve a set of activities, which may or may not be conducted in a set order depending on the desired transaction. For example, a desired transaction to be mapped can include a cashier transaction, which can involve the activities of scanning items, determining price, exchanging cash, and bagging the item. The system of the example implementations can determine that a transaction has occurred, and depending on the desired implementation, can map the time taken for each activity so the user can determine where inefficiencies in the transaction are occurring. Further, transactions may involve activities conducted across multiple work surfaces, depending on the desired implementation.

Figure 12:
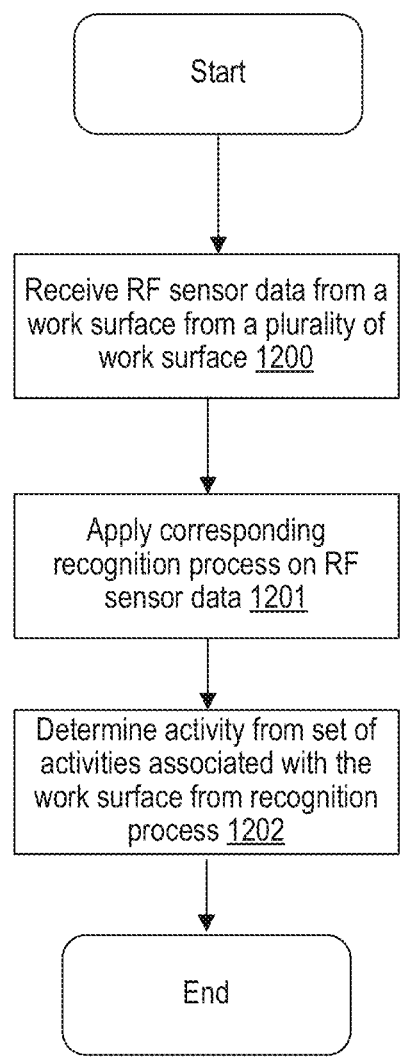
FIG. 12 illustrates an example flow diagram for managing a system of work surfaces, in accordance with an example implementation.

FIG. 12 illustrates an example flow diagram for managing a system of work surfaces, in accordance with an example implementation. At 1200, RF sensor data is received from a work surface from the plurality of work surfaces. At 1201, the recognition process corresponding to the work surface providing the RF sensor data is executed on the RF sensor data. If wearable sensor data is also detected, the recognition process is executed on the RF sensor data and the wearable data. At 1202, the recognition process determines an activity from the set of activities associated with the work surface that corresponds to the RF sensor data, or the combination of the RF sensor data and the wearable sensor data.

Figure 13:
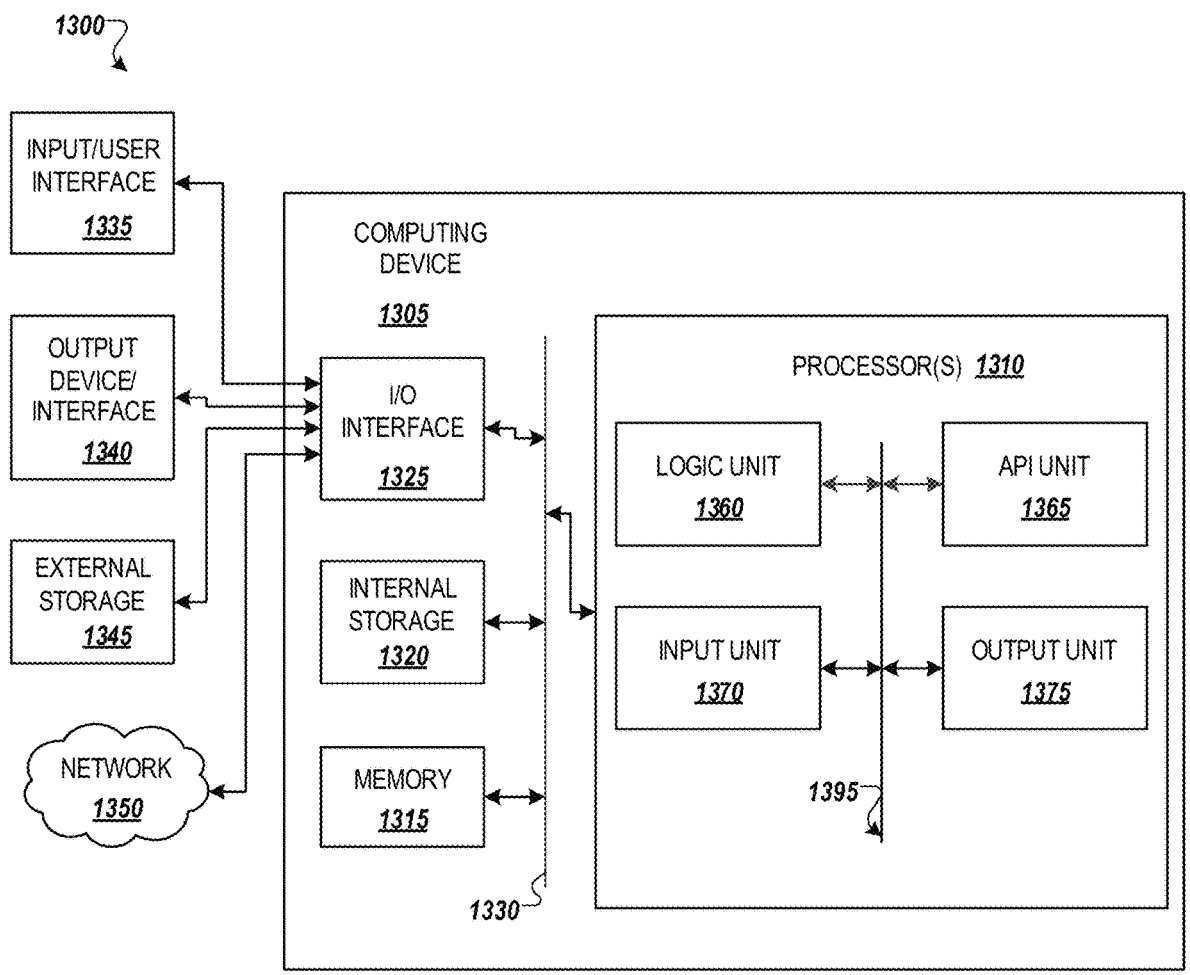
FIG. 13 illustrates an example computing environment with an example computer device suitable for use in some example implementations.

FIG. 13 illustrates an example computing environment with an example computer device suitable for use in some example implementations, such as an apparatus to facilitate the management of a plurality of work surfaces, each of the plurality of work surfaces associated with one or more radio frequency (RF) sensors, each of the plurality of work surfaces associated with a set of activities. In example implementations, work surfaces can include any surface that an RF sensor can be affixed to and that is utilized for interactions from users, such as a work desk, a cashier counter, a table, a shelf with dishes or plates, and so on according to the desired implementation.

Computer device 1305 in computing environment 1300 can include one or more processing units, cores, or processors 1310, memory 1315 (e.g., RAM, ROM, and/or the like), internal storage 1320 (e.g., magnetic, optical, solid state storage, and/or organic), and/or I/O interface 1325, any of which can be coupled on a communication mechanism or bus 1330 for communicating information or embedded in the computer device 1305.

Computer device 1305 can be communicatively coupled to input/user interface 1335 and output device/interface 1340. Either one or both of input/user interface 1335 and output device/interface 1340 can be a wired or wireless interface and can be detachable. Input/user interface 1335 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1340 may include a display, television, monitor, printer, speaker, braille, or the like. In some example implementations, input/user interface 1335 and output device/interface 1340 can be embedded with or physically coupled to the computer device 1305. In other example implementations, other computer devices may function as or provide the functions of input/user interface 1335 and output device/interface 1340 for a computer device 1305.

Examples of computer device 1305 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1305 can be communicatively coupled (e.g., via I/O interface 1325) to external storage 1345 and network 1350 for communicating with any number of networked components, devices, and systems, including one or more computer devices of the same or different configuration. Computer device 1305 or any connected computer device can be functioning as, providing services of, or referred to as a server, client, thin server, general machine, special-purpose machine, or another label.

I/O interface 1325 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1300. Network 1350 can be any network or combination of networks (e.g., the Internet, local area network, wide area network, a telephonic network, a cellular network, satellite network, and the like).

Computer device 1305 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1305 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1310 can execute under any operating system (OS) (not shown), in a native or virtual environment. One or more applications can be deployed that include logic unit 1360, application programming interface (API) unit 1365, input unit 1370, output unit 1375, and inter-unit communication mechanism 1395 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1365, it may be communicated to one or more other units (e.g., logic unit 1360, input unit 1370, output unit 1375). In some instances, logic unit 1360 may be configured to control the information flow among the units and direct the services provided by API unit 1365, input unit 1370, output unit 1375, in some example implementations described above. For example, the flow of one or more processes or implementations may be controlled by logic unit 1360 alone or in conjunction with API unit 1365. The input unit 1370 may be configured to obtain input for the calculations described in the example implementations, and the output unit 1375 may be configured to provide output based on the calculations described in example implementations.

Memory 1315 can be configured to store management information as illustrated in FIG. 10 and FIG. 11 to facilitate the implementations for detecting activities for each of the managed work spaces from the plurality of work spaces. As illustrated in FIG. 10, the set of activities associated with the work surface can include one or more activities detected only based on RF sensor data, and one or more activities detected based on RF sensor data and wearable sensor data.

Processor(s) 1310 can be configured to monitor the one or more RF sensors for each of the plurality of work surfaces. For the one or more RF sensors of a work surface from the plurality of work surfaces providing RF sensor data, processor(s) 1310 can be configured to apply a recognition algorithm associated with the work surface from the plurality of work surfaces to determine, from the RF sensor data, an activity from the set of activities associated with the work surface from the plurality of work surfaces corresponding to the RF sensor data.

Processor(s) 1310 can be configured to generate the recognition algorithm from machine learning as illustrated in FIG. 8. For example, processor(s) 1310 can be configured to generate the recognition algorithm for each of the plurality of work surfaces, by applying machine learning to a labeled training set for the each of the plurality of work surfaces, the labeled training set comprising a plurality of RF sensor readings associated with activities from the set of activities associated with the each of the plurality of work surfaces; and generating the recognition algorithm for the each of the plurality of work surfaces from the application of machine learning to the labeled training set. The labeled training set can involve wearable sensor data and RF sensor readings associated with one or more activities from the set of activities for the each of the plurality of work surfaces, as illustrated in FIGS. 3 to 5.

For example implementations that also involve wearable devices or IMUs, processor(s) 1310 can also be configured to monitor one or more wearable devices for the work surface from the plurality of work surfaces. For the one or more wearable devices for the work surface from the plurality of work surfaces providing wearable sensor data and for the one or more RF sensors of the work surface from the plurality of work surfaces providing RF sensor data, the processor(s) 1310 are configured to apply the recognition algorithm associated with the work surface from the plurality of work surfaces to determine, from the RF sensor data and the wearable sensor data, another activity from the set of activities associated with the work surface from the plurality of work surfaces corresponding to the RF sensor data and the wearable sensor data, based on the management information as stored in memory 1315 and the RF sensor data signature and the wearable sensor data signature.

Processor(s) 1310 can further be configured to detect a transaction from activities detected from the plurality of work surfaces, wherein the transaction involves a plurality of activities detected from the plurality of work surfaces conducted in a sequence as illustrated in FIG. 11.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A non-transitory computer readable medium, storing instructions for executing a process for managing a plurality of work surfaces, each of the plurality of work surfaces associated with one or more radio frequency (RF) sensors, each of the plurality of work surfaces associated with a set of activities, the instructions comprising:
    monitoring the one or more RF sensors for each of the plurality of work surfaces;
    monitoring one or more wearable devices for each of the plurality of work surfaces;
    for at least one work surface of the plurality of work surfaces, wherein the at least one work surface is located between the one or more RF sensors and an activity performed with respect to the at least one work surface:
        receiving RF sensor data from the one or more RF sensors associated with the at least one work surface, the RF sensor data comprising an RF signature reflected from an object performing the activity with respect to the at least one work surface and detected by the one or more RF sensors;
        determining a material of the at least one work surface based on the RF sensor data;
        receiving wearable sensor data from the one or more wearable devices associated with the at least one work surface, wherein the wearable sensors data comprises inertial measurement unit (IMU) data from the one or more wearable devices;
        correlating the RF sensor data and the IMU data with respect to at least one of location and time; and
        determining an activity corresponding to the RF sensor data and the wearable sensor data from the set of activities associated with the respective work surface by applying a recognition algorithm associated with the at least one work surface based on the correlation of the IMU data and the RF sensor data, wherein the activity is determined by applying the recognition algorithm associated with the at least one work surface based on the detected material,
    wherein the recognition algorithm is generated from machine learning.

2. The non-transitory computer readable medium of claim 1, the instructions further comprising:
    receiving second RF sensor data from the one or more RF sensors associated with the at least one work surface; and
    determining another activity corresponding to the second RF sensor data from the set of activities associated with the respective work surface by applying the recognition algorithm associated with the at least one work surface based on the RF sensor data.

3. The non-transitory computer readable medium of claim 2, wherein the set of activities associated with the work surface comprises one or more activities detected only based on RF sensor data, and one or more activities detected based on RF sensor data and wearable sensor data.

4. The non-transitory computer readable medium of claim 1, further comprising generating the recognition algorithm for each of the plurality of work surfaces, the generating the machine learning algorithm for each of the plurality of work surfaces comprising:
    applying machine learning to a labeled training set for the each of the plurality of work surfaces, the labeled training set comprising a plurality of RF sensor readings associated with activities from the set of activities associated with the each of the plurality of work surfaces; and
    generating the recognition algorithm for the each of the plurality of work surfaces from the application of machine learning to the labeled training set.

5. The non-transitory computer readable medium of claim 4, wherein the labeled training set further comprises wearable sensor data and RF sensor readings associated with one or more activities from the set of activities for the each of the plurality of work surfaces.

6. The non-transitory computer readable medium of claim 1, further comprising detecting a transaction from activities detected from the plurality of work surfaces, the transaction comprising a plurality of activities detected from the plurality of work surfaces conducted in a sequence.

7. A method for managing a plurality of work surfaces, each of the plurality of work surfaces associated with one or more radio frequency (RF) sensors, each of the plurality of work surfaces associated with a set of activities, the method comprising:
    monitoring the one or more RF sensors for each of the plurality of work surfaces;
    monitoring one or more wearable devices for each of the plurality of work surfaces;
    for at least one work surface of the plurality of work surfaces, wherein the at least one work surface is located between the one or more RF sensors and an activity performed with respect to the at least one work surface:
        receiving RF sensor data from the one or more RF sensors associated with the at least one work surface, the RF sensor data comprising an RF signature reflected from an object performing the activity with respect to the at least one work surface and detected by the one or more RF sensors;
        determining a material of the at least one work surface based on the RF sensor data;
        receiving wearable sensor data from the one or more wearable devices associated with the at least one work surface, wherein the wearable sensors data comprises inertial measurement unit (IMU) data from the one or more wearable devices;
        correlating the RF sensor data and the IMU data with respect to at least one of location and time; and
        determining an activity corresponding to the RF sensor data and the wearable sensor data from the set of activities associated with the respective work surface by applying a recognition algorithm associated with the at least one work surface based on the correlation of the IMU data and the RF sensor data, wherein the activity is determined by applying the recognition algorithm associated with the at least one work surface based on the detected material,
    wherein the recognition algorithm is generated from machine learning.

8. The method of claim 7, further comprising:
    receiving second RF sensor data from the one or more RF sensors associated with the at least one work surface; and
    determining another activity corresponding to the second RF sensor data from the set of activities associated with the respective work surface by applying the recognition algorithm associated with the at least one work surface based on the RF sensor data.

9. The method of claim 8, wherein the set of activities associated with the work surface comprises one or more activities detected only based on RF sensor data, and one or more activities detected based on RF sensor data and wearable sensor data.

10. The method of claim 7, further comprising generating the recognition algorithm for each of the plurality of work surfaces, the generating the machine learning algorithm for each of the plurality of work surfaces comprising:
applying machine learning to a labeled training set for the each of the plurality of work surfaces, the labeled training set comprising a plurality of RF sensor readings associated with activities from the set of activities associated with the each of the plurality of work surfaces; and
generating the recognition algorithm for the each of the plurality of work surfaces from the application of machine learning to the labeled training set.

11. The method of claim 10, wherein the labeled training set further comprises wearable sensor data and RF sensor readings associated with one or more activities from the set of activities for the each of the plurality of work surfaces.

12. The method of claim 7, further comprising detecting a transaction from activities detected from the plurality of work surfaces, the transaction comprising a plurality of activities detected from the plurality of work surfaces conducted in a sequence.

13. An apparatus communicatively coupled to a plurality of work surfaces, each of the plurality of work surfaces coupled to one or more radio frequency (RF) sensors, each of the plurality of work surfaces associated with a set of activities managed by the apparatus, the apparatus comprising:
a memory, configured to manage the set of activities for each of the plurality of work surfaces; and
a processor, configured to:
monitor the one or more RF sensors for each of the plurality of work surfaces;
monitor one or more wearable devices for each of the plurality of work surfaces;
for at least one work surface of the plurality of work surfaces, wherein the at least one work surface is located between the one or more RF sensors and an activity performed with respect to the at least one work surface:
receive RF sensor data from the one or more RF sensors associated with the at least one work surface, the RF sensor data comprising an RF signature reflected from an object performing the activity with respect to the at least one work surface and detected by the one or more RF sensors;
determine a material of the at least one work surface based on the RF sensor data;
receive wearable sensor data from the one or more wearable devices associated with the at least one work surface, wherein the wearable sensors data comprises inertial measurement unit (IMU) data from the one or more wearable devices;
correlate the RF sensor data and the IMU data with respect to at least one of location and time; and
determine an activity corresponding to the RF sensor data and the wearable sensor data from the set of activities associated with the respective work surface by applying a recognition algorithm associated with the at least one work surface based on the correlation of the IMU data and the RF sensor data, wherein the activity is determined by applying the recognition algorithm associated with the at least one work surface based on the detected material,
wherein the recognition algorithm is generated from machine learning.

14. The apparatus of claim 13, wherein the processor is configured to:
receive second RF sensor data from the one or more RF sensors associated with the at least one work surface; and
determine another activity corresponding to the second RF sensor data from the set of activities associated with the respective work surface by applying the recognition algorithm associated with the at least one work surface based one the RF sensor data.

15. The apparatus of claim 14, wherein the set of activities associated with the work surface comprises one or more activities detected only based on RF sensor data, and one or more activities detected based on RF sensor data and wearable sensor data.

16. The apparatus of claim 13, wherein the processor is further configured to generate the recognition algorithm for each of the plurality of work surfaces, by:
applying machine learning to a labeled training set for the each of the plurality of work surfaces, the labeled training set comprising a plurality of RF sensor readings associated with activities from the set of activities associated with the each of the plurality of work surfaces; and
generating the recognition algorithm for the each of the plurality of work surfaces from the application of machine learning to the labeled training set.

17. The apparatus of claim 16, wherein the labeled training set further comprises wearable sensor data and RF sensor readings associated with one or more activities from the set of activities for the each of the plurality of work surfaces.

18. The apparatus of claim 13, wherein the processor is configured to detect a transaction from activities detected from the plurality of work surfaces, the transaction comprising a plurality of activities detected from the plurality of work surfaces conducted in a sequence.

* * * * *